(12) United States Patent
Dascalescu et al.

(10) Patent No.: US 12,521,731 B2
(45) Date of Patent: Jan. 13, 2026

(54) INSTALLATION INTENDED TO SEPARATE, IN AN ELECTRIC FIELD, THE COMPONENTS OF A MIXTURE OF FIBRES AND GRANULES USING A TRIBOCHARGER PROVIDED WITH A GRATING FOR THE SELECTIVE CONFINEMENT OF SAID COMPONENTS

(71) Applicants: Compagnie Generale Des Etablissements Michelin, Clermont-Ferrand (FR); CENTRE NATIONAL DE LA RECHERCHE SCIENTIFIQUE, Paris (FR); ECOLE NATIONALE SUPERIEURE DE MECANIQUE ET D'AEROTECHNIQUE, Futuroscope Chasseneuil (FR); UNIVERSITE DE POITIERS, Poitiers (FR)

(72) Inventors: Lucien Dascalescu, Clermont-Ferrand (FR); Thami Zeghloul, Clermont-Ferrand (FR); Karim Medles, Clermont-Ferrand (FR); Thomas Simonelli, Clermont-Ferrand (FR); Christophe Le Clerc, Clermont-Ferrand (FR)

(73) Assignees: COMPAGNIE GENERALE DES ETABLISSEMENTS MICHELIN, Clermont-Ferrand (FR); CENTRE NATIONAL DE LA RECHERCHE SCIENTIFIQUE, Paris (FR); ECOLE NATIONALE SUPERIEURE DE MECANIQUE ET D'AEROTECHNIQUE, Futuroscope Chasseneuil (FR); UNIVERSITE DE POITIERS, Poitiers (FR)

(*) Notice: Subject to any disclaimer, the term of this patent is extended or adjusted under 35 U.S.C. 154(b) by 0 days.

(21) Appl. No.: 18/710,061

(22) PCT Filed: Nov. 10, 2022

(86) PCT No.: PCT/EP2022/081533
§ 371 (c)(1),
(2) Date: May 14, 2024

(87) PCT Pub. No.: WO2023/083988
PCT Pub. Date: May 19, 2023

(65) Prior Publication Data
US 2025/0018403 A1    Jan. 16, 2025

(30) Foreign Application Priority Data

Nov. 15, 2021  (FR) ..................................... 2112031
Feb. 8, 2022   (FR) ..................................... 2201098

(51) Int. Cl.
*B03C 7/00*   (2006.01)
*B03C 7/06*   (2006.01)
*B03C 7/10*   (2006.01)

(52) U.S. Cl.
CPC ................ *B03C 7/006* (2013.01); *B03C 7/06* (2013.01); *B03C 7/10* (2013.01)

(58) Field of Classification Search
CPC .............. B03C 7/00; B03C 7/006; B03C 7/10
See application file for complete search history.

(56) References Cited

U.S. PATENT DOCUMENTS 5,746,320 A * 5/1998 Fujita ........................ B03C 7/10
209/127.4
6,271,492 B1 * 8/2001 Maehata ................. B29B 17/02
209/127.1

(Continued)

FOREIGN PATENT DOCUMENTS

DE   112009004345 B4   12/2015
WO   2009028217 A1    11/2010

*Primary Examiner* — Joseph C Rodriguez
(74) *Attorney, Agent, or Firm* — Dickinson Wright PLLC

(57) ABSTRACT

An installation intended to separate the components of a mixture containing fibers (2) and granules (3) is provided. The installation comprises a tribocharger (4) for conferring an electrostatic charge upon the components (2, 3), and at least one pair of electrodes (5, 6) for generating a separating electric field that conveys the charged components, according to their polarity, up to collectors (10, 11). The tribocharger (4) has a containment grating (14) arranged so as to retain the components in the tribocharger (4) until the components (2, 3) have reached a sufficient charge, then to allow the components, once charged, through into the gap (7), from which point the components (2, 3) reach their collector (10, 11) under the effect of the separating electric field.

20 Claims, 4 Drawing Sheets

(56) References Cited

U.S. PATENT DOCUMENTS

| | | | |
|---|---|---|---|
| 6,365,857 B1* | 4/2002 | Maehata | B03C 7/06 209/127.1 |
| 6,415,929 B1* | 7/2002 | Maehata | B03C 7/06 209/127.3 |
| 6,452,126 B1* | 9/2002 | Xiao | B29B 17/02 209/127.1 |
| 6,720,514 B1* | 4/2004 | Inoue | B03C 7/06 209/127.1 |
| 6,927,354 B1 | 8/2005 | Brown et al. | |
| 9,700,899 B2* | 7/2017 | Park | B03C 7/006 |
| 2012/0085683 A1* | 4/2012 | Calin | B03C 3/368 209/12.2 |

\* cited by examiner

INSTALLATION INTENDED TO SEPARATE, IN AN ELECTRIC FIELD, THE COMPONENTS OF A MIXTURE OF FIBRES AND GRANULES USING A TRIBOCHARGER PROVIDED WITH A GRATING FOR THE SELECTIVE CONFINEMENT OF SAID COMPONENTS

CROSS-REFERENCE TO RELATED APPLICATIONS

This U.S. patent application is a national phase entry of PCT Patent Application No. PCT/EP2022/081533 filed Nov. 10, 2022, which claims priority to French Patent Application No. FR2201098, filed Feb. 8, 2022 and French Patent Application No. FR2112031 filed Nov. 15, 2021, the entire contents of which are incorporated herein by reference in their entirety.

BACKGROUND

1. Field of the Invention

The present invention relates to the general field of installations and separation methods intended to separate the various components of a mixture containing at least one first family of components and one second family of components.

The present invention is notably applicable for treating industrial waste in the form of a mixture containing at least two families of components, and in particular for treating a mixture containing, on the one hand, fibres and, on the other hand, granules, with a view to recycling the constituent materials of these components.

The invention is more specifically applicable for treating mixtures that originate from grinding pneumatic tires and that contain textile fibres, notably made of polyethylene terephthalate, and granules made of rubber-based material.

The present invention is notably applicable for treating mixtures with components that are millimetric and sub-millimetric in terms of size, i.e., in particular for treating mixtures that contain fibres with a diameter ranging between 10 µm and 1 mm for a length ranging between 1 mm and 10 mm, and granules with an equivalent diameter that ranges between 125 µm and 5 mm.

2. Related Art

Numerous methods are known that are intended for separating the components of a mixture.

In particular, document FR 2943561 discloses a method during which a mixture made up of different granules, belonging to two families of different materials, is poured over a fluidized bed that is located in the lower part of a gap delimited by two electrodes with opposite polarities. Said electrodes are in the form of substantially vertical conveyor belts, and generate an electric field in the gap. When the fluidized bed stirs and suspends the granules that form the mixture in the gap, it confers an electrostatic charge upon said granules by a triboelectric effect, with the sign of said electrostatic charge depending on the family to which each considered granule belongs. Once a granule is electrically charged, said granule is attracted and captured by the electrode whose polarity is opposite that of said granule, and thus adheres to the corresponding conveyor belt, which conveyor belt then conveys said granule out of the gap up to a suitable collector.

While such an installation is substantially satisfactory in practice, it nevertheless can have some limitations and disadvantages.

SUMMARY

Indeed, the inventors have observed that while such a known installation could be very effective for treating mixtures of relatively homogeneous granules, its efficiency dropped significantly when the mixture was made up of heterogeneous components in terms of their form, and notably when the mixture contained, on the one hand, granules and, on the other hand, fibres. Indeed, in the fluidized bed, the fibres, which are lighter and have relatively high aerodynamic drag, tend to float above the granules, so that the number of impacts of said fibres with the granules may not be sufficient in order to confer an electrostatic charge level upon said fibres that is sufficient for obtaining effective separation by the electric field.

In addition, the conveyor belts forming the electrodes can be relatively expensive to manufacture. Such a conveyor belt conveyor arrangement is also relatively vulnerable to fouling, since charged components, or even dust, can sometimes creep between a conveyor belt and the rollers that drive said conveyor belt, and, if applicable, that allow the necessary bias voltage to be applied to said conveyor belt. Such an incident can alter said conveyor belt by deformation, which deformation is potentially detrimental to the control of the electric field. Furthermore, such an alteration is likely to increase the rate of wear of the relevant conveyor belt and therefore to reduce the lifetime thereof.

The aims assigned to the invention therefore aim to overcome the aforementioned disadvantages and to propose a new separation installation with increased efficiency and reliability, notably for treating mixtures made up of fibres and granules, by having a structure that is equally robust, simple and compact.

The aims assigned to the invention are achieved by means of a separation installation intended to receive a mixture containing at least one first family of components, preferably fibres, and one second family of components, preferably granules, said installation comprising a triboelectric charging device, called "tribocharger", which is arranged to receive the mixture and, through the triboelectric effect, to confer electrostatic charges upon the components of said mixture, which electrostatic charges are of opposite polarities depending on whether the components belong to the first family or to the second family, said installation further comprising at least one first electrode and one second electrode, which are separated from each other by a gap and are connected to a generator that allows a potential difference to be applied between the first electrode and the second electrode in order to generate an electric field, called "separating electric field", in the gap that is intended to direct the charged components, according to their polarity, either towards a first collector intended to collect components of the first family, or, respectively, towards a second collector distinct from the first collector and intended to collect components of the second family, said installation being characterized in that the tribocharger receives the mixture inside an enclosure that is delimited by a containment wall that separates said enclosure from the first and second electrodes and first and second collectors, said containment wall being arranged such that the mixture that is contained in the enclosure experiences the triboelectric charging effect and is simultaneously exposed to the separating electric field, and said containment wall being provided with a grating that is arranged so as to retain components of the mixture inside the enclosure until said components have reached, under the effect of the tribocharger, an electrostatic charge that is sufficient for said components to escape from the chamber, by crossing the containment wall through the grating, under the effect of the separating electric field, and to thus reach the collector that corresponds to them, as a function of their polarity.

Advantageously, interposing a containment wall according to the invention between the enclosure and the collectors allows a buffer zone to be created that is formed by the enclosure, in which buffer zone the mixture is held for just the right amount of time for conferring upon the components, before releasing said components into the gap, an electrostatic charge level for said components that is sufficient to ensure that the components can be conveyed up to the collectors and captured by said collectors, under the effect of the separating electric field.

The grating, like a screen, actually fulfils a selection function, by retaining the uncharged, or insufficiently charged, components inside the enclosure, and thus preventing said components from being prematurely released into the gap, and notably from falling into the gap under the simple effect of gravity, while said grating will be able to allow through said components once they have been charged.

As long as the grating retains the components inside the enclosure, the tribocharger can enhance the electrostatic charge of said components by continuing the triboelectric effect thereon for the required time, while the permanent immersion of the enclosure in the separating electric field allows said separating electric field to immediately and permanently exert an attractive force on the components, as soon as said components acquire an electrostatic charge.

Thus, more specifically, the permanent immersion of the enclosure, and therefore of the components being charged that are contained in said enclosure, in the separating electric field, advantageously allows said separating electric field to automatically extract the components, by facilitating or even forcing the passage of said components through the grating, as soon as the components have reached an electrostatic charge that is high enough with respect to their size and shape.

In this respect, the invention is particularly perfectly adapted for treating heterogeneous mixtures containing fibres and granules, and notably mixtures containing highly variable proportions of fibres relative to the granules.

Indeed, the inventors have observed that the number of fibres, due to their length, typically a length greater than the mesh of the screen formed by the grating, can only exit the enclosure when they are sufficiently charged so that, when pressed against the grating under the effect of the separating electric field, said fibres deform, notably bend, and thus successfully pass through the grating.

Similarly, the inventors have observed that the granules, when they are not charged, generally form agglomerates by adhering to fibres that impede said granules and thus prevent said granules from passing through the grating, even when the granule, when considered individually, is nevertheless smaller than the mesh of the screen formed by the grating. However, when the granules reach a sufficient electrostatic charge, the electric field will be able to detach them from the fibres and to help said granules to pass through the containment wall, by passing through the grating.

Thus, advantageously, the invention is more efficient, since it allows effective separation of the components to be obtained in a quasi-systematic manner, then allows effective recovery of said components by the collectors as a function of the family to which said components belong, and does so practically without generating residues or losses in the form of components that would remain captive inside the enclosure or that, respectively, when released into the gap, would avoid being captured by the collectors and would fall to the bottom of the installation.

BRIEF DESCRIPTION OF THE DRAWINGS

Further aims, features and advantages of the invention will become apparent in further detail from reading the following description and with reference to the appended drawings, which are provided purely by way of illustration and without limitation, and in which.

DETAILED DESCRIPTION OF EXAMPLE EMBODIMENTS

Figure 1:
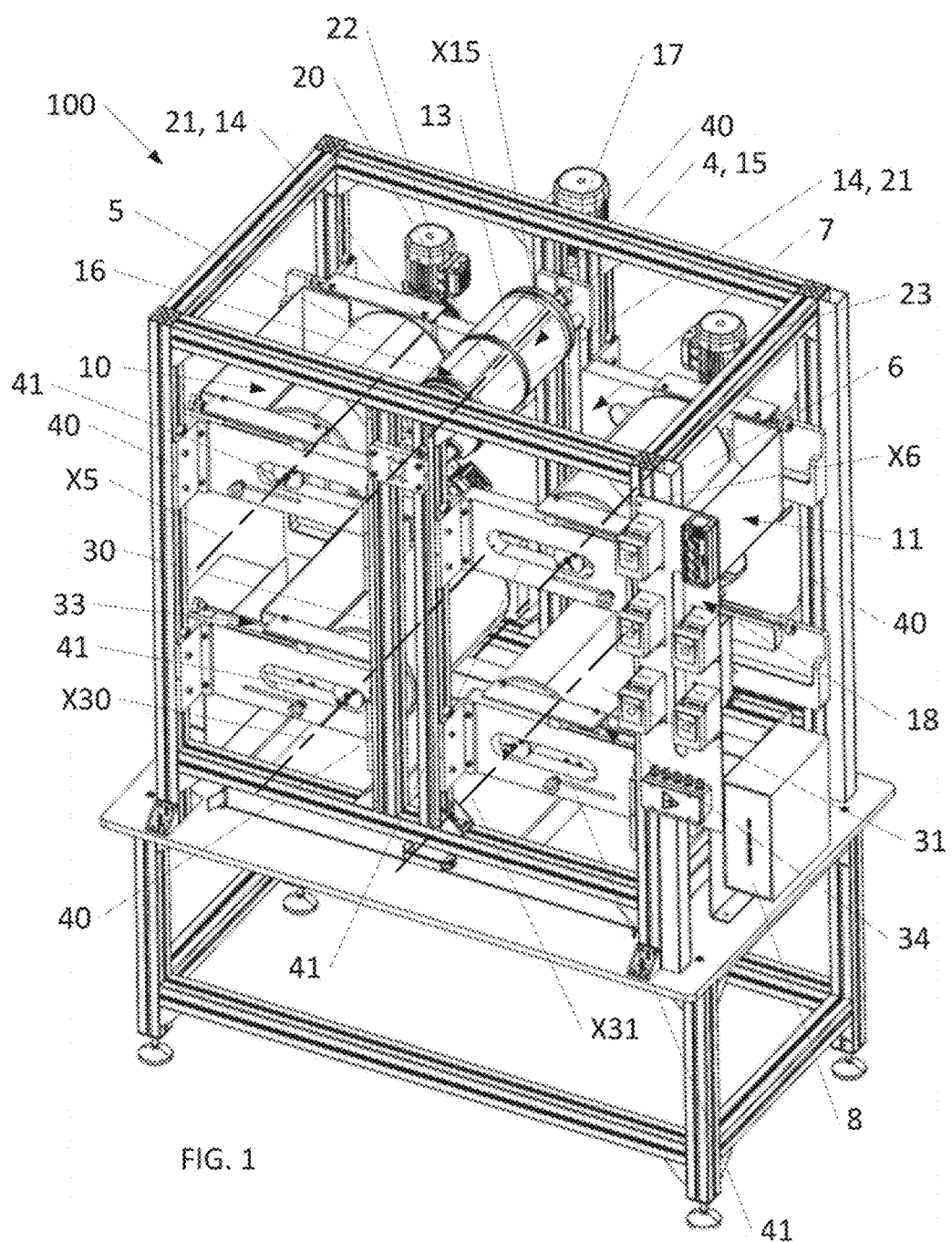
FIG. 1 illustrates, as a perspective view, an example of an installation according to the invention, which comprises two pairs of rotary cylindrical electrodes with horizontal axes, forming two capturing stages, and the tribocharger of which is formed by a cylindrical containment drum, the tubular side wall of which forms the grating that ensures the selective retention of the components of the mixture as a function of their electrostatic charge level.

The present invention relates to a separation installation 100 intended to receive a mixture 1 containing at least one first family of components 2, preferably fibres 2, and one second family of components 3, preferably granules 3.

Preferably, the components of the first family will be fibres 2, which will assume a thin and elongated shape, preferably a substantially cylindrical shape. For ease of description, the components of the first family therefore can be considered to be equivalent to fibres 2 hereafter.

At least some, preferably most of said fibres 2 present in the mixture 1 (i.e., more than 50% of the total number of fibres present), and more preferably all (100% of the total number of fibres present) of said fibres 2 that are present in the mixture 1 will have a length ranging between 1 mm and 10 mm, while the largest transverse dimension thereof, i.e., the largest dimension considered perpendicular to their length, i.e., typically the diameter in the case of a cylindrical fibre, will range between 10 µm and 1 mm. The installation 100 preferably will be designed to be able to separate and recover (at least) fibres with such dimensions.

More preferably, the fibres 2 will have a dimension, called length dimension, that is clearly greater than the other two dimensions, called transverse dimensions, and more specifically will have a length at least 5 times, preferably at least 10 times, at least 20 times, or even at least 50 times or even 100 times greater than the largest of these two transverse dimensions, i.e., typically, in the case of a cylindrical fibre 2, a length at least 5 times, preferably at least 10 times, at least 20 times, or even at least 50 times or even 100 times greater than the diameter of the relevant fibre 2.

The fibres 2 can be made of a natural or synthetic textile material, and more preferably of a polymer or a combination of polymers from among (non-exhaustive list): polyethylene terephthalate (PET), polyethylene (PE), polypropylene (PP), polyvinyl chloride (PVC), polystyrene (PS).

Preferably, the components of the second family will be granules 3. For ease of description, the components of the second family therefore can be considered to be equivalent to granules 3 hereafter.

At least some of the granules 3 present in the mixture 1, preferably most of the granules 3 present in the mixture 1 (more than 50% of the total number of granules present), and more preferably all (100% of the total number of granules present) of said granules 3 present in the mixture 1 will preferably have an equivalent diameter ranging between 125 µm and 5 mm, and a form factor ranging between 1 and 2.

The term "equivalent diameter" denotes the diameter that a dummy sphere would have, which would occupy the same volume as the volume occupied by the considered granule 3.

The term "form factor" denotes the ratio between, on the one hand, the maximum Feret diameter, i.e., the maximum distance, observable for the considered granule 3, between two straight lines that are parallel to each other and tangent, respectively, to opposite sides of said considered granule 3, and, on the other hand, the minimum Feret diameter, i.e., the minimum distance, observable for the considered granule 3, between two straight lines that are parallel to each other and tangent, respectively, to opposite sides of said considered granule. This form factor allows a good indication to be provided of the slenderness of the granules 3. By way of an indication, by way of a reminder a form factor equal to 1 corresponds to a sphere, and a form factor equal to the square root of 2 corresponds to a cube.

The installation 100 preferably will be designed to be able to separate and recover (at least) granules 3 with the aforementioned dimensions, and more specifically in order to be able to sort, by separating them, on the one hand, granules 3 with such dimensions and, on the other hand, fibres 2 with the aforementioned dimensions, which are initially mixed with one another in the mixture 1.

Preferably, the installation 100 will notably allow mixtures 1 to be treated for which the proportion by weight of the fibres 2, relative to the total weight of the mixture 1, represents between 5% and 75%, while the proportion by weight of the granules 3, relative to the total weight of the mixture 1, represents between 25% and 95%.

The installation 100 comprises a triboelectric charging device 4, called "tribocharger" 4, that is arranged to receive the mixture 1 and to confer electrostatic charges upon the components 2, 3 of said mixture 1, by the triboelectric effect, with said electrostatic charges having opposite polarities depending on whether the components 2, 3 belong to the first family (in this case the fibres 2) or to the second family (in this case the granules 3).

The tribocharger 4 mixes the components 2, 3, so that said components rub against one another and/or against a wall of the tribocharger 4, which creates electron transfers on their surface and thus confers electrostatic charges upon said components 2, 3.

The installation 100 further comprises at least one first electrode 5 and one second electrode 6, which are separated from each other by a gap 7 and are connected to a generator 8, which allows a potential difference to be applied between the first electrode 5 and the second electrode 6 in order to generate an electric field, called "separating electric field", in the gap 7.

This separating electric field is intended to direct the charged components 2, 3, according to their polarity, either towards a first collector 10, which is intended to collect components 2 of the first family, in this case, therefore, of the fibres 2, or, respectively, towards a second collector 11, which is distinct from the first collector 10 and which is intended to collect components 3 of the second family, in this case, therefore, granules 3.

The first electrode 5 is arranged to attract, by the effect of Coulomb forces, the charged components of a family, in this case by convention the charged components of the first family, i.e., the charged fibres 2.

Said first electrode 5 could be distinct from the first collector 10 and set back from the first collector 10, relative to the zone where the charged fibres 2 are released into the gap 7, so that the fibres 2 that move towards the first electrode 5 under the effect of the separating electric field are intercepted and captured by the first collector 10 before reaching said first electrode 5.

However, preferably, the first electrode 5 is an integral part of the first collector 10, and is arranged to receive and capture the fibres 2 on its surface, as is the case in the alternative embodiments of FIGS. 1, 2, 3 and 5.

Similarly, the second electrode 6 is arranged to attract, by the effect of Coulomb forces, the charged components of the other family, in this case by convention the charged components of the second family, i.e., the charged granules 3.

Said second electrode 6 could be distinct from the second collector 11 and set back from the second collector 11, relative to the zone where the charged granules 3 are released into the gap 7, so that the granules 3 that move towards the first electrode 6 under the effect of the separating electric field are intercepted and captured by the second collector 11 before reaching said second electrode 6.

However, preferably, the second electrode 6 is an integral part of the second collector 11, and is arranged to receive and capture the granules 3 on its surface, as is the case in the alternative embodiments of FIGS. 1, 2, 3 and 5.

Preferably, as is clearly seen in FIG. 2, the tribocharger 4 is located in line with the gap 7 and such that at least part of said gap 7 extends below the tribocharger 4, which advantageously allows the charged components 2, 3 originating from the tribocharger 4 to be discharged in the upper part of the gap 7, and thus to be able to take advantage of a certain vertical range of travel, or "free flight", during which said components 2, 3 undergo, simultaneously with gravity, the Coulomb forces due to the combination of their electrostatic charge and the separating electric field, so that said separating electric field is capable of deviating said components 2, 3 and conveying them to the collectors 10, 11 where said components are captured.

In this respect, the first and second electrodes 5, 6 are preferably each located on a different side of a vertical reference plane P0, which preferably forms a sagittal plane of the gap 7 and more generally of the installation 100 and which preferably passes through the middle of the tribocharger 4, and said electrodes 5, 6 are preferably located at an altitude lower than that of the tribocharger 4. The same preferably will be the case for the corresponding collectors 10, 11, which laterally delimit the gap 7, and which are located at a lower altitude than that of the tribocharger 4 and are each on a different side of the reference plane P0.

According to the invention, the tribocharger 4 receives the mixture 1 inside an enclosure 12, which is delimited by a containment wall 13 that separates said enclosure 12 from the first and second electrodes 5, 6 and from the first and second collectors 10, 11.

Thus, the components 2, 3 introduced into the tribocharger 4 are initially captive in the enclosure 12 of the tribocharger 4, so that said components 2, 3 cannot directly reach the collectors 10, 11, or even the electrodes 5, 6, without firstly passing through the containment wall 13 that forms an obstacle between the inside of the enclosure 12 and said collectors 10, 11. In other words, the trajectory that leads a component 2, 3 placed in the enclosure 12 to the collector 10, 11 dedicated to said component 2, 3 must pass via, and through, the containment wall 13.

The containment wall 13 is arranged in such a way that the mixture 1 that is contained in the enclosure 12 experiences the triboelectric charging effect and, at the same time, is exposed to the separating electric field.

In other words, the enclosure 12, and therefore the components 2, 3 that said enclosure 12 holds captive, are immersed in the separating electric field, while the tribocharger 4 mixes said components 2, 3 inside the enclosure 12, in order to electrically charge said components 2, 3 by friction.

Furthermore, the containment wall 13 is provided with a grating 14 that is arranged so as to retain the components 2, 3 of the mixture 1 inside the enclosure 12 until said components 2, 3 have reached, under the effect of the tribocharger 4, an electrostatic charge that is sufficient for said components 2, 3 to escape from the enclosure 12, by crossing the containment wall 13 through the grating 14, under the effect of the separating electric field, and to thus reach the collector 10, 11 that corresponds to them, as a function of their polarity.

The containment wall 13, and more specifically the grating 14, advantageously forms a physical barrier that prevents the components 2, 3 of the mixture that are not yet charged, or that are insufficiently charged in order to be sure to reach the collectors 10, 11, from escaping from the enclosure 12, which allows the tribocharger 4 to start the action of charging said components 2, 3 and of continuing the action of charging said components 2, 3 as long as necessary, i.e., until said components 2, 3 are sufficiently charged in order to be released into the gap 7, and are driven by the separating electric field to the collectors 10, 11.

The containment wall 13 thus in a way defines the boundary between two sub-chambers within the installation 100, namely, on the one hand, a first buffer sub-chamber, which is formed by the enclosure 12 closed by the containment wall 13 and its grating 14, and within which the components 2, 3 are introduced and can be retained for the time required for said components 2, 3 to acquire a sufficient electrostatic charge, and, on the other hand, a second sub-chamber, in which the collectors 10, 11 are located, and which communicates with the enclosure 12 through the grating 14, in this case only through the grating 14, so that the collectors 10, 11 are not accessible to the components 2, 3 as long as said components 2, 3 are contained in the enclosure 12, but become accessible to said components as soon as said components 2, 3 have passed through the grating 14 in order to be found in the second sub-chamber, in "free flight" in the gap 7, and therefore free to reach the collectors 10, 11 under the effect of the separating electric field.

In practice, the second sub-chamber can correspond to the main enclosure of the installation 100, delimited by a casing that covers the frame of said installation.

Advantageously, the segregation provided by the grating 14 between sufficiently charged components 2, 3 and insufficiently charged components 2, 3 guarantees the quality and the purity of the filtered products, i.e., the fibres 2, on the one hand, and the granules 3, on the other hand, which are separately collected by the collectors 10, 11, since only the components 2, 3 that are sufficiently charged to reach the collectors 10, 11, and to allow their family of origin to be differentiated as a function of the sign of their charge, are effectively extracted from the enclosure 12, and more specifically torn from the enclosure 12 through the grating 14, then collected by the collectors 10, 11, while the insufficiently charged components 2, 3 cannot leave the tribocharging zone.

The grating 14 can assume any shape allowing the containment wall 13 to be perforated by defining an array of several through openings that will form as many passages for the components 2, 3, by linking the inside of the enclosure 12 with the portion of the gap 7 located outside said enclosure 12, and the dimensions of which will define a mesh adapted to the segregation function provided by the grating 14 against the components 2, 3.

This mesh, which is selected in order to block the uncharged components but to allow through the sufficiently charged components, will be defined notably as a function of the expected combination of the charge of the components 2, 3 (and therefore of the Coulomb force that the separating electric field exerts on them), the shape and the dimensions of said components, and the mechanical stiffness and elasticity properties of their constituent material.

The grating 14 will thus form a type of screen, which occupies all or some of the containment wall 13, and can be referred to as "screen" hereafter.

Preferably, and notably with respect to the dimensions and to the preferred nature of the aforementioned fibres 2 and granules 3, the grating 14 forms a screen, the mesh $M14$ of which ranges between 1 mm and 10 mm, and more preferably between 2 mm and 5 mm.

It should be noted that, in absolute terms, it is not out of the question that the mixture 1 can contain a certain amount of components 2, 3, the size of which would be too great such that it would prevent the concerned components, even carriers of a high electrostatic charge and therefore subjected to a high Coulomb force, from passing through the mesh $M14$ of the grating 14, or, on the contrary, would be too small so that the grating 14 can effectively retain said components 2, 3, even those not charged, inside the enclosure 12, against gravity.

However, there is always at least one group of components 2, 3 in the mixture 1 selected to be treated by the installation 100, with the sizes of said components being, in terms of the electrostatic and mechanical properties of the constituent material of said components 2, 3, adapted so that these components, which are not charged, and which, if applicable, are agglomerated together, are retained by the grating 14 inside the enclosure 12, while said components 2, 3, once they are intentionally charged by the effect of the tribocharger 4, at a suitable charging level, will be able to pass through said grating 14 under the effect of the separating electric field.

In particular, at least some, preferably most or even all the fibres 2 will preferably be longer than the mesh M14, will have a diameter that is strictly less than the mesh M14, and will be formed from a sufficiently flexible material to be able, once electrically charged, to bend under the effect of the Coulomb force exerted by the separating electric field, typically bent into a U shape, and thus to be able to cross the mesh M14 of the grating 14.

Similarly, the granules 3 will preferably have an equivalent diameter that is substantially equal to the mesh M14, or is slightly less than the mesh M14, for example, ranging between 80% and 100% of the mesh M14, so as to be retained by the grating 14 when they are agglomerated with fibres 2, and to be able to pass through the meshes of the grating 14, either spontaneously or with some elastic contraction, when they are charged and subjected to the attraction force of the separating electric field.

Of course, in the presence of a mixture 1 with a given composition, the size of the mesh M14 of the grating 14 can be adapted in order to obtain the best possible efficiency for the installation 100, and notably in order to optimize the selective retention capacity of the grating 14, i.e., to optimize the compromise between the capacity of the grating 14 to retain the insufficiently charged components 2, 3, and its capacity to allow through the sufficiently charged components 2, 3.

Preferably, a mixture 1 is prepared for which the components of the same family have relatively homogeneous properties from one component of the family to the next, in that at least 50% by number of the components 2 of the first family, and/or at least 50% by number of the components 3 of the second family, or even at least 80% by number of the components 2 of the first family and/or at least 80% by number of the components 3 of the second family, will have properties, and notably sizes, that allow them to meet the selectivity criterion, i.e., to be sensitive to the segregation provided by the grating 14, which involves blocking for said components 2, 3 (i.e., retains said components) when said components are uncharged or are insufficiently charged, and which becomes passable (i.e., allows said components through) when said components have acquired a sufficient charge.

The homogeneity of the components of the same family can be obtained, for example, by appropriately selecting the conditions for obtaining the mixture 1, notably when the mixture is obtained by grinding, and/or by optionally subjecting the mixture 1 to initial sieving, optionally fairly coarse sieving, in order to calibrate said mixture 1 before introducing the mixture 1 into the tribocharger 4.

Various types of tribochargers 4 can be contemplated for equipping the installation 100.

However, preferably, the tribocharger 4 will be arranged so that it is the enclosure 12 that is moved, relative to the frame of the installation 100, preferably a rotational movement, so as to cause the mixture 1 to be mixed, which causes the components 2, 3 to rub together and against the containment wall 13 of the enclosure 12.

Preferably, as can be seen in FIGS. 1, 2, 3 and 5, the tribocharger 4 comprises a cylindrical containment drum 15, preferably with a circular base, which is delimited by a tubular side wall 16 that extends along and around a central axis X15 forming an angle of less than 30 degrees with the horizontal. Said tubular side wall 16 forms the containment wall 13, and at least one portion of said tubular side wall 16 forms the grating 14.

Advantageously, implementing a cylindrical tribocharger 4 provides the installation with a simple, compact, and robust structure.

Furthermore, by placing the mixture 1 in a tribocharger 4, and more specifically in a containment drum 15, which is coated and which is cylindrical, preferably a shape exhibiting symmetry of revolution, it is advantageously possible to use the rotation R15 of the drum 15 on itself, about its central axis X15, to mix the components 2, 3, and therefore create or increase the electrostatic charge of said components 2, 3.

This rotation R15 is preferably provided by a motor 17, such as an electric motor 17, controlled by a control unit 18.

The rotation R15 of the containment drum 15 on itself, about its central axis X15, is preferably continuous and monotonous, i.e., carried out in an uninterrupted manner and always in the same direction. Thus, efficient stirring of the mixture 1 is advantageously obtained, without any jerking and without any risk of the mixture 1 settling, and moreover without any jerking or vibration of the tribocharger 4, or excessive noise, which improves the lifetime, the reliability and the ease of use of the installation 100.

The rotation speed R15 is moderated, so as, on the one hand, to allow natural mixing of the mixture 1, by the mixture self-collapsing and constantly turning inward, under the combined action of the rotation R15 (which allows the side wall 16 to take away and raise a portion of the mixture along said side wall, in the direction of rotation R15, as seen in a section normal to the axis of rotation X15) and of gravity (which drops this portion of the mixture raised by the rotation onto the rest of the mixture), and, on the other hand, to avoid a centrifugation effect of the mixture 1, which would tend to compact said mixture 1 or even to prematurely eject, due to the centrifugal force, uncharged components 2, 3.

Thus, the rotation speed R15 preferably will be selected as a function of the internal diameter of the containment drum 15, so that the centrifugal acceleration experienced by the mixture 1 due to said rotation R15 remains less than 125 $m \cdot s^{-2}$, i.e., less than 12.75 times the gravitational acceleration. In practice, for a granule 3 with a mass of the order of 0.15 grams, such an acceleration will generate a centrifugal force of approximately 0.018 Newtons on said granule 3.

By way of an indication, for an internal diameter of the containment drum 15 preferably ranging between 100 mm and 1,000 mm, and more specifically between 120 mm and 500 mm, the rotation speed R15 will preferably range between 10 rpm and 150 rpm, more preferably between 30 rpm and 90 rpm.

The side wall 16 of the containment drum 15 can comprise a perforated rigid reinforcement 20, which acts as a support for mesh panels 21, in this case curved panels that follow substantially or even exactly the curvature of the side wall 16 of the containment drum 15, which mesh panels 21 conform to the openings of the reinforcement 20 so as to form as many portions of the grating 14.

The provision for the enclosure 12 of the tribocharger 4 can be implemented by any suitable feed system, for example, by means of a worm screw, of the Archimedes screw type, which removes the mixture 1 in a neighbouring silo in order to transfer it into the enclosure 12, or even by means of a hopper that discharges the mixture 1 into said enclosure 12 of the tribocharger 4.

Moreover, it should be noted that, optionally, the radially inner face of the side wall 16 of the containment drum 15 can be provided with protuberances, such as blades, which help to divide and stir the mixture 1 during the rotation R15, in order to accentuate the friction phenomena and thus improve the efficiency of the tribocharging.

Although it is possible to contemplate, in absolute terms, orienting the central axis X15 of the containment drum 15 in an exactly horizontal manner, the central axis X15 will preferably form a non-zero angle with the horizontal.

Indeed, this means that it is possible to contemplate continuous operation of the installation 100, i.e., continuously feeding the tribocharger 4 with the mixture 1, with very low energy consumption.

Indeed, the central axis X15, and therefore the containment drum 15, is thus provided with an incline that places the inlet of the containment drum, in this case corresponding to the base of the cylinder located at one of the two axial ends of said containment drum 15, considered along the central axis X15, at an altitude higher than the altitude of the outlet of the containment drum 15, which for its part corresponds to the base of the cylinder forming the other, opposite axial end of said containment drum 15.

Under the combined effect of the rotation R15 and of gravity, this incline of the containment drum 15, and more specifically of the side wall 16 of said containment drum 15, allows the mixture 1 to be gradually and continuously conveyed from the inlet to the outlet of the containment drum, along the central axis X15.

It should be noted that, when the enclosure 12 is formed by a containment drum 15, steps will be taken to ensure that the containment drum 15 will not be filled over its entire height, i.e., over the entire extent of its transverse section, in order to maintain a vacuum in the upper part of the cylinder that is sufficient to allow the mixture 1 to be effectively stirred during the rotation R15 of the containment drum 15. By way of an indication, the filling rate will be such that the mixture 1 occupies, in the lower part of the cylinder, a height that is less than or equal to 40% of the internal diameter of the containment drum 15, for example, a height ranging between 25% and 30% of said internal diameter.

Preferably, the first electrode 5 is formed by a cylindrical electrode 5, preferably with a circular base, rotatably mounted R5 about a first horizontal central axis X5 and the surface of which forms a portion of the first collector 10 while being capable of collecting the components 2 of the first family and of discharging said components 2 out of the gap 7 by its rotational movement R5.

Preferably, and in particular when the first electrode 5 is formed by a rotary cylindrical electrode as indicated above, the second electrode 6 is formed by a second cylindrical electrode 6, preferably with a circular base, which is rotatably mounted R6 about a second horizontal central axis X6, radially offset relative to the first central axis X5, preferably parallel to the first central axis X5, and more preferably located at the same altitude as that of the first central axis X5.

The surface of the second cylindrical electrode 6 then advantageously forms a portion of the second collector 11 while being capable of collecting the components 3 of the second family and of discharging said components 3 out of the gap 7 by its rotational movement R6.

The central axes X5, X6 are substantially horizontal, i.e., form an angle of less than 10 degrees with the horizontal, preferably of less than 5 degrees, and more preferably they will be exactly horizontal.

Figure 2:
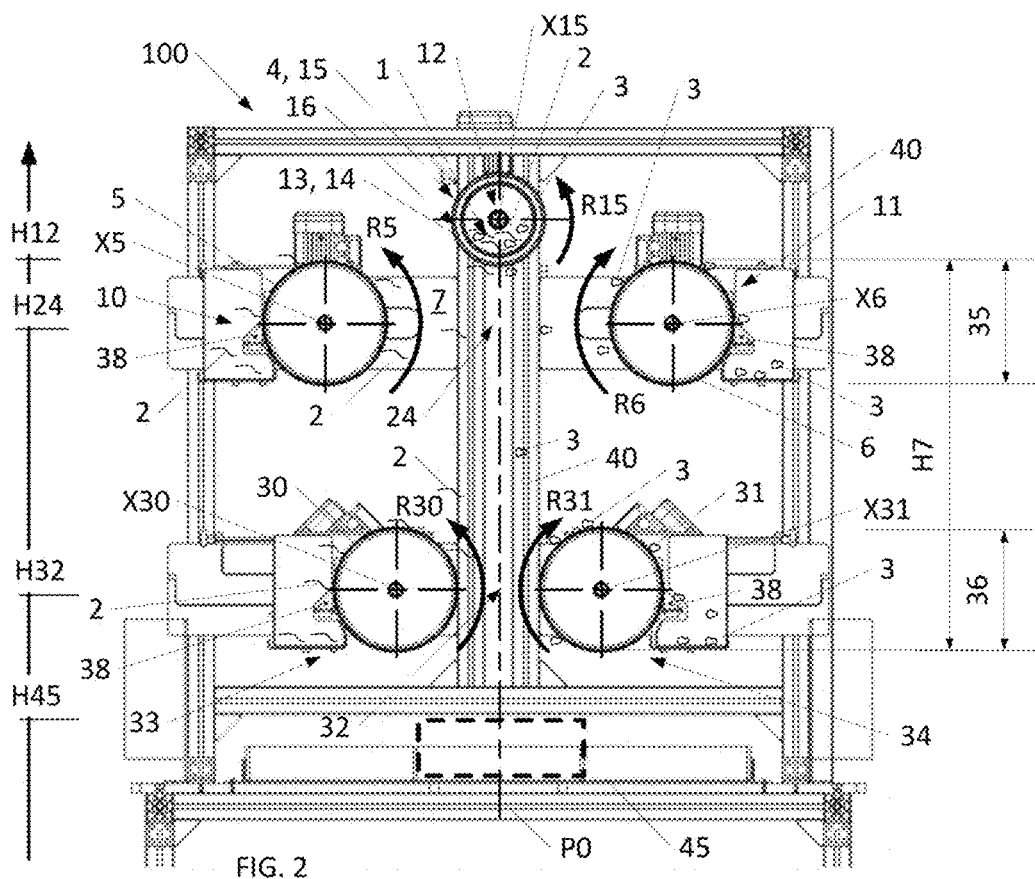
FIG. 2 is a front cross-section view of the installation of FIG. 1, in a vertical plane, substantially normal to the axis of rotation of the containment drum and to the axes of rotation of the cylindrical electrodes.

The term "parallel" used herein indicates that the central axes X5, X6 extend in the same vector direction, i.e., that the first central axis X5 and the second central axis X6 are each normal to the same reference plane, in this case more preferably to the same reference vertical plane, as is the case for the projection plane of FIG. 2.

The first and second electrodes 5, 6 are preferably counter-rotating. More preferably, the directions of the rotations R5, R6 are such that the tangential speed of the surface of the electrode 5, 6, considered at the narrowest point of the gap 7 (in this case the point on the surface of said electrode that is closest to the sagittal reference plane P0), increases vertically towards the tribocharger 4 located above the gap 7, in the opposite direction to that of the natural fall of the components 2, 3 under the effect of gravity. This notably allows transferring the components 2, 3 out of the gap 7 to be secured, by preventing the components 2, 3 captured by the electrodes 5, 6 from being accidentally detached and falling towards the bottom of the installation 100.

Preferably, the first and second electrodes 5, 6 at least partially axially overlap, and more preferably fully axially overlap, in this way said electrodes 5, 6 each occupy the same considered axial range, in the common direction of their central axes X5, X6.

Projected in a horizontal plane, the tribocharger 4, and more specifically the containment drum 15, at least partially, preferably fully, axially extends in the axial range that is common to the first electrode 5 and to the second electrode 6. The central axis X15 of the containment drum 15 is preferably contained in a vertical plane, in this case the reference sagittal plane P0, that is parallel to the central axes X5, X6 of the electrodes 5, 6 (and therefore which in this case is perpendicular to the vertical projection plane of FIG. 2).

The first and second electrodes 5, 6 preferably will be set into rotation R5, R6 by motors 22, 23, preferably electric motors 22, 23, controlled by the control unit 18.

Figure 4:
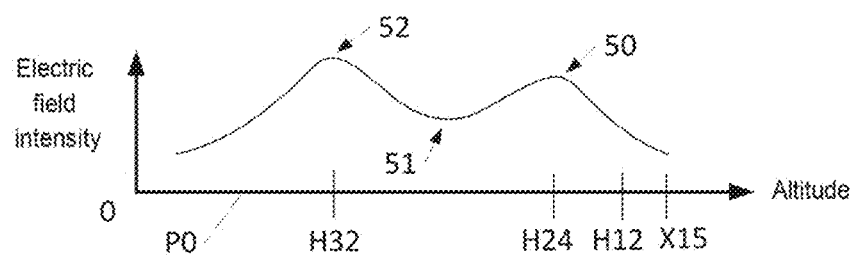
FIG. 4 illustrates, as a schematic graph, the intensity of the separating electric field as a function of the altitude, vertically in line with the axis of rotation of the tribocharger of the installation of FIGS. 1 to 3, in the sagittal plane of the installation, and shows two intensity peaks that correspond to the constrictions of the gap between each of the two pairs of electrodes.
Figure 7:
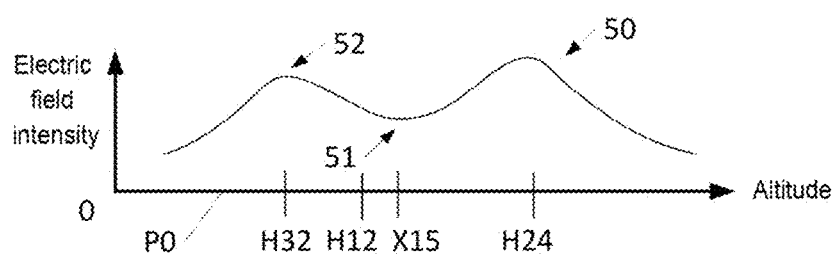
FIG. 7 illustrates, using the same schematic graph as that of FIG. 4, the intensity of the separating electric field as a function of the altitude, vertically in line with the axis of rotation of the tribocharger of the installation of FIG. 6, in the sagittal plane of said installation.

Preferably, the first electrode 5 and the second electrode 6 together form, at the minimum distance between them, a first constriction 24 of the gap 7, which first constriction 24 is located at a first altitude H24, and the installation 100 comprises a third electrode 30 and a fourth electrode 31, also experiencing a potential difference, and which together form, at the minimum distance between them, a second constriction 32 of the gap 7 that is located at a second altitude H32 lower than the first altitude H24, such that the separating electric field successively has, along the vertical, a first intensity peak 50 in the first constriction 24, at the first altitude H24, then an intensity which, between the first altitude H24 and the second altitude H32, firstly decreases and then re-increases in order to form an intensity trough 51 and then to reach a second intensity peak 52 in the second constriction 32, at the second altitude H32, as illustrated in FIG. 4 or FIG. 7.

The width of the first constriction 24 in this case corresponds to the difference between, on the one hand, the distance that separates the central axes X5, X6 of the first and second electrodes 5, 6 and, on the other hand, the sum of the radius of the first electrode 5 and of the radius of the second electrode 6.

Similarly, the width of the second constriction 32 in this case corresponds to the difference between, on the one hand, the centre distance that separates the central axes X30, X31 of the third and fourth electrodes 30, and, on the other hand, the sum of the radius of the third electrode 30 and the radius of the fourth electrode 31.

Advantageously, the installation 100 thus has, according to a preferred feature, which can constitute a completely separate invention, a structure comprising (at least) two capturing stages 35, 36, namely a first upper capturing stage 35, corresponding to the first pair of electrodes formed by the first and second electrodes 5, 6 that define part of the separating electric field for which the intensity culminates at the first constriction 24, then a second lower capturing stage 36, corresponding to the second pair of electrodes formed by the third and fourth electrodes 30, 31, which define another part of the separating electric field for which the intensity culminates at the second constriction 32.

According to a preferred alternative arrangement that corresponds to FIGS. 2, 3, 4 and 5, the enclosure 12 of the tribocharger 4 is located at an altitude, called "drop altitude" H12, that is greater than the first altitude H24 of the first constriction 24.

In this way, a component 2, 3 that exits the enclosure 12 through the containment wall 13 and that falls under the effect of gravity can, if necessary, successively pass through the first capturing stage 35, then the second capturing stage 36, and therefore in particular the first intensity peak 50, by passing through the first constriction 24, then the second intensity peak 52, by passing through the second constriction 32, so that, if said component 2, 3 is too heavy and/or insufficiently charged, relative to its weight or relative to the distance that initially said separates component from the collector 10, 11 corresponding thereto, in order to be captured by the first upper capturing stage 35, it is then possible for said component 2, 3 to be remedially captured by the second lower capturing stage 36. Thus, a high level of recovery of the components 2, 3 will be ensured.

Figure 6:
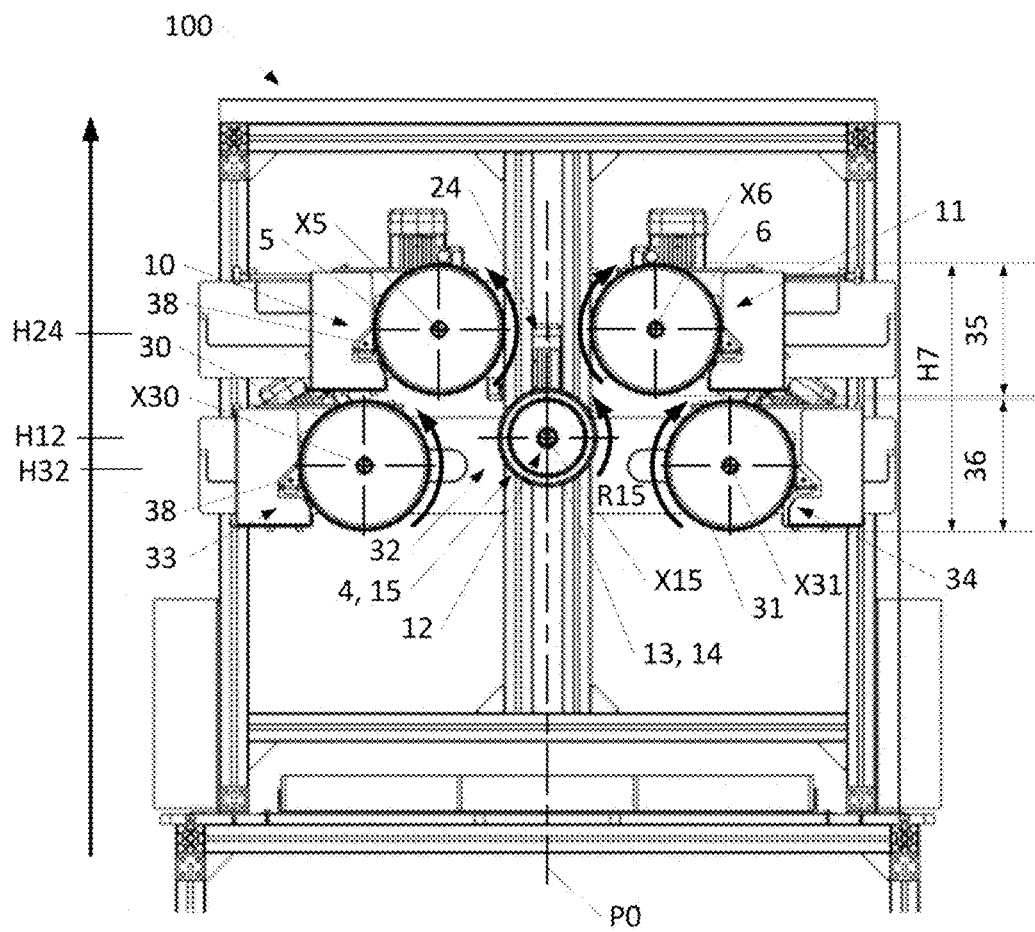
FIG. 6 illustrates, as a front cross-section view in the same vertical cutting plane as that of FIG. 2, an alternative arrangement, called "staggered arrangement", of the installation of FIG. 1 and in which the containment drum is positioned at an intermediate altitude between the two pairs of electrodes.

According to another preferred alternative arrangement, called "staggered arrangement", and which corresponds to FIGS. 6 and 7, the enclosure 12 of the tribocharger 4 is located at an altitude, called "drop altitude" H12, that is an intermediate altitude, i.e., which this time is less than the first altitude H24 of the first constriction 24 and is greater than the second altitude H32 of the second constriction 32. In other words, the enclosure 12 of the tribocharger 4, and more specifically the grating 14, in this case is at least partially, or even fully, vertically contained between the first constriction 24 and the second constriction 32, so that the enclosure 12, and more specifically the grating 14, at least partially, and preferably fully, extends below the first constriction 24 and above the second constriction 32.

Indeed, the inventors have observed that it was possible to allow, using such a configuration in which the tribocharger 4 is vertically placed in the intermediate position between the first and second constrictions 24, 32, fibres 2 to be extracted that exhibit a high degree of purity, greater than that observed in the preceding configuration whereby the tribocharger 4 is placed above both the first constriction 24 and the second constriction 32. During tests carried out by the inventors, this improvement in purity was observed on each of the two capturing stages 35, 36.

More specifically, according to such a staggered alternative arrangement, and when a containment drum 15 as described above is used, the central axis X15 of the containment drum 15 will be located at an intermediate altitude, strictly ranging between the first altitude H24 of the first constriction 24 and the second altitude H32 of the second constriction 32.

More specifically, when using cylindrical electrodes 5, 6, 30, 31, the respective altitudes of which are defined by their respective central axes X5, X6, X30, X31, then the central axis X15 of the containment drum 15 can be located at an altitude that is, on the one hand, lower than the altitude of the central axis X5 of the first electrode 5, and more preferably lower than both the altitude of the central axis X5 of the first electrode 5 and the altitude of the central axis X6 of the second electrode 6, and, on the other hand, greater than the altitude of the central axis X30 of the third electrode 30, and more preferably greater than both the altitude of the central axis X30 of the third electrode 30 and the altitude of the central axis X31 of the fourth electrode 31.

Such a staggered arrangement of the containment drum 15 relative to an array of distinct electrodes 5, 6, 30, 31 comprising a first, a second, a third and a fourth electrode 5, 6, 30, 31, so that the central axis X15 of the containment drum 15 is located inside, and preferably is located at the centre, of the prism whose central axes X5, X6, X30, X31 of said electrodes 5, 6, 30, 31 define the edges, can clearly constitute a completely separate invention.

Preferably, moreover irrespective of the vertical positioning of the tribocharger 4, the third electrode 30 will be located on the same side of the reference sagittal plane P0 as the first electrode 5, in this case on the left in FIGS. 1 and 2, and will have the same polarity as the first electrode 5.

The third electrode 30 preferably will be associated with a third collector 33, distinct from the first and the second collector 10, 11, and is intended to collect the components 2 of the first family. More preferably, the third electrode 30 will form part of said third collector 33, by being arranged so as to be able to capture the components 2 on its surface.

Similarly, the fourth electrode 31 preferably will be located on the same side of the sagittal reference plane P0 as the second electrode 6, in this case on the right in FIGS. 1 and 2, and will have the same polarity as the second electrode 6.

The fourth electrode 31 preferably will be associated with a fourth collector 34, distinct from the first, second and third collectors 10, 11, 33, and is intended to collect the components 3 of the second family. More preferably, the fourth electrode 31 will form part of said fourth collector 34, by being arranged so as to be able to capture the components 3 on its surface.

Preferably, the third and fourth electrodes 30, 31 are, just like the first and second electrodes 5, 6, each formed by a cylindrical electrode 30, 31, preferably with a circular base, rotatably mounted R30, R31 about its horizontal central axis X30, X31.

The features described with reference to the first pair of electrodes 5, 6, notably concerning the orientation of the axes and the directions of rotation R30, R31, clearly can apply mutatis mutandis to the second pair of electrodes 30, 31.

According to a particularly preferred feature, irrespective of the arrangement of the electrodes 5, 6, 30, 31 and irrespective of the intensity diagram of the separating electric field that is generated by said electrodes 5, 6, 30, 31, and in particular when the first, second, third and fourth electrodes 5, 6, 30, 31 are each formed by a rotary cylinder as indicated above, each of the first, second, third and fourth electrodes 5, 6, 30, 31 is associated with, or more preferably belongs to, a distinct collector 10, 11, 33, 34, such that each of said first, second, third and fourth electrodes 5, 6, 30, 31 can discharge the components 2, 3 captured on its surface out of the gap 7, independently of the other electrodes 5, 6, 30, 31.

The installation 100 thus has a simple and inexpensive structure, which ensures distinct discharging, by the capturing stage 35, 36 and by the polarity, of the various components 2, 3. It is thus possible for sorting to be provided that is easy and offers good reliability, and with a high flow rate.

The collectors 10, 11, 33, 34 can be provided with scrapers 38, located outside the gap 7, which rub against the corresponding electrode 5, 6, 30, 31 in order to detach the components 2, 3 captured by said electrode, which components 2, 3 then can be either temporarily stored in a container provided to this end, or discharged by means of a suitable conveyor.

"Outside the gap 7" by convention is understood herein to denote the region of the space that is located on the side opposite the centre of the gap 7, and is therefore oriented towards the outside of the installation 100, relative to a vertical reference plane that is parallel to the reference sagittal plane P0 and that contains the central axis X5, X6, X30, X31 of the considered electrode 5, 6, 30, 31.

According to a particularly simple embodiment, the potential difference applied between the third electrode 30 and the fourth electrode 31 can be identical to the potential difference applied between the first and the second electrode 5, 6. To this end, notably, the first and the third electrode 5, 30 both can be connected to the same terminal of the generator 8, while the second and the fourth electrode 6, 31 are both connected to the same other terminal of the generator 8.

As an alternative embodiment, it is nevertheless possible to apply different potential differences to each pair of electrodes, if applicable by means of two distinct generators or of the same generator providing several independent outputs.

By way of an indication, it is possible to implement an installation with the following dimensional features:
- upper electrodes, i.e., the first and second electrodes 5, 6, each having a diameter, preferably an equal diameter, ranging between 250 mm and 400 mm;
- lower electrodes, i.e., the third and fourth electrodes 30, 31, each having a diameter, preferably an equal diameter, ranging between 250 mm and 500 mm;
- a containment drum 15 having an internal diameter ranging between 200 mm and 300 mm;
- a smaller distance between the upper electrodes 5, 6, i.e., a first constriction 24, equal to the internal diameter of the containment drum 15 increased by 200 mm;
- a smaller distance between the lower electrodes 30, 31, i.e., a second constriction 32, equal to 300 mm; and
- each electrode of the same pair (upper pair, lower pair, respectively) being located at the same altitude as the other electrode of the same pair.

Preferably, the installation 100 can comprise position adjustment components 40, 41 for modifying the position of one and/or the other of the central axes X15 of the containment drum and/or X5, X6, X30, X31 of either of the electrodes 5, 6, 30, 31.

In particular, as can be seen in FIG. 1, it is possible to provide a system of vertical rails 40 for modifying, preferably independently of one another, the altitude of the containment drum 15, respectively one and/or the other of the altitudes of the electrodes 5, 6, 30, 31.

Similarly, horizontal rails 41 can be provided, preferably perpendicular to the central axes X15, X5, X6, X30, X31, in order to modify the horizontal position of the electrodes 5, 6, 30, 31, preferably independently of one another, notably so as to be able to adjust and modify, if necessary, the centre distances of each pair of electrodes 5, 6, 30, 31, respectively, and or the distance of one and/or the other of the electrodes relative to the vertical alignment of the tribocharger (in this case therefore the distance relative to the reference plane P0).

Preferably, the surface, preferably cylindrical surface, of the electrodes 5, 6, 30, 31 is covered with a layer made of an electrically insulating material for preventing charges of the electrode 5, 6, 30, 31 from being exchanged with the components 2, 3 that adhere to its surface.

The term "electrically insulating material" used herein denotes a material with resistivity that is equal to or greater than $10^{10}$ $\Omega\cdot m$ at a temperature of 300 Kelvin.

This insulating layer can assume, for example, the form of a coating, made of PTFE or PET, for example, preferably ranging between 10 μm and 100 μm thick, which will be deposited onto the core of the electrode, which itself is made of metal, for example, made of copper alloy, aluminium alloy or stainless steel.

Preferably, the electrodes 5, 6, 30, 31 that define the separating electric field as a whole occupy an altitude range H7, called "altitude range of the gap" H7, that extends from the altitude of the lowest point of all of said electrodes, in this case the bottom line of the third or fourth electrode 30, 31, up to the highest point of all of said electrodes, in this case the crest line of the first or of the second electrode 5, 6, and the tribocharger 4, called "first tribocharger" 4, is located in an upper part of the installation 100 such that at least part, preferably at least half, and more preferably all, of the altitude range of the gap H7 extends below the altitude H12 of the lowest point of the enclosure 12 receiving the mixture 1, i.e., below the aforementioned drop altitude H12.

Thus, the enclosure 12, and more specifically the grating 14, is located in the upper part of the gap 7, so that the components 2, 3 that exit the enclosure 12, at the drop altitude H12, benefit from a significant drop height, which leaves space and time for the electrodes 5, 6, 30, 31 to divert the trajectory of said components towards the collectors 10, 11, 33, 34.

In all cases, of course, the tribocharger 4, and more specifically the enclosure 12 and its grating 14, nevertheless remain positioned in the zone of influence of the separating electric field, so that the components 2, 3 are caught by said separating electric field and pulled out of the enclosure 12, through the grating 14, as soon as they are charged.

According to a particularly preferred feature that can constitute a completely separate invention, notably irrespective of the nature of the first tribocharger 4, the installation 100 can then also comprise, in a lower part, in line with the first tribocharger 4 and at an altitude H45 that is strictly lower than the altitude of said first tribocharger 4, in this case, therefore, strictly lower than the drop altitude H12, a fluidized bed 45, schematically shown using dashed lines in FIG. 2, which forms a second tribocharger 45 capable of electrically recharging and resuspending the components 2, 3 of the mixture 1 in the gap 7 that would have fallen from the first tribocharger 4 and would have vertically passed through the gap 7 without being captured by the collectors 10, 11, 33, 34.

Advantageously, the efficiency of the installation 100 is thus further improved, by reducing the losses that would correspond to a residue that would be formed by the components dropped from the enclosure but not captured and therefore not sorted after they have passed through the installation 100.

According to a preferred feature that can constitute a completely separate invention, the installation 100 comprises, at an intermediate altitude located between the first upper capturing stage 35, formed by the first electrode 5 and the second electrode 6, and the second lower capturing stage 36, formed by the third electrode 30 and the fourth electrode 31, a non-return baffle 46, which is arranged to allow the components 2, 3 not captured by the first capturing stage 35 to transition towards the second capturing stage 36, while preventing the components 2, 3 resuspended in the second capturing stage 36 by the fluidized bed 45 from rising beyond said non-return baffle 46, and in particular from rising up to the first capturing stage 35.

Figure 5:
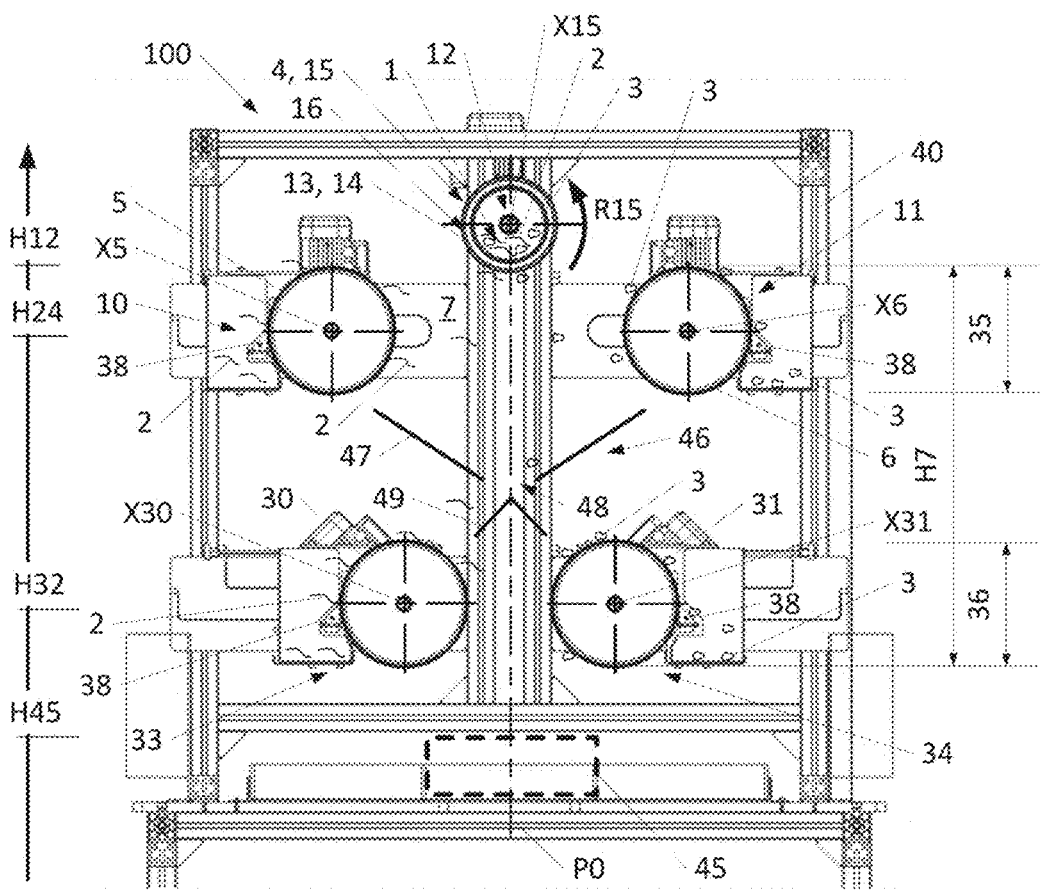
FIG. 5 illustrates, along the same cutting plane as FIG. 2, an alternative embodiment of the installation that comprises a non-return baffle between the first pair of electrodes and the second pair of electrodes, in order to prevent the components from rising that are resuspended in the gap by a fluidized bed located in the lower part of the installation.

Said non-return baffle 46 preferably firstly comprises, as can be seen in FIG. 5, a hopper 47 with convergent walls that is able to collect the components 2, 3 falling from the first capturing stage 35 and to direct said components 2, 3, through a lower opening 48, towards the second capturing stage 36, then a divergent deflector 49, which is placed under the hopper 47 in line with t the lower opening 48 so as to allow the components 2, 3 originating from the hopper 47 to fall in the second capturing stage 36, while preventing the components 2, 3 resuspended in the second capturing stage 36 by the fluidized bed 45 from rising through the lower opening 48 towards the first capturing stage 35, and therefore from rising beyond said non-return baffle 46, and in particular from rising up to the first capturing stage 35.

Advantageously, in the second capturing stage 36, in the gap delimited by the third and fourth electrodes 30, 31, the components 2 that have not been captured when they initially drop and that are resuspended, by the fluidized bed 45, in the lower part of the gap 7, are thus contained in the second capturing stage 36. The efficiency of the installation is thus improved, by preventing the fluidized bed 45 from dispersing the components 2, 3 out of the gap 7.

The width horizontally covered by the deflector 49 preferably represents at least 50%, at least 75%, at least 85%, or even at least 95% of the distance that horizontally separates the third electrode 30 from the fourth electrode 31. Thus, the deflector 49 forms a type of cap that covers most, or even all, the lower zone of the gap 7 that is included between the third and fourth electrodes 30, 31, and constitutes an obstacle that prevents the components 2, 3 present in this lower zone of the gap 7 from exiting said lower zone of the gap.

The deflector 49 is preferably arranged so as to overlap and entirely cover, projected in a horizontal plane, the lower opening 48 of the hopper 47, and even to overflow beyond the lower opening 48, so that the components 2, 3 present in the lower zone of the gap, under the deflector 49, cannot vertically rise through said lower opening 48.

Advantageously, the non-return baffle 46 also prevents the gaseous flow, in this case ascending, emitted by the fluidized bed 45 from disrupting the operation of the first capturing stage 35, in the upper part of the gap 7.

The walls of the hopper 47, respectively, the walls of the deflector 49, can be formed by inclined plates that extend lengthwise parallel to the axes X5, X6, X30, X31 of the electrodes 30, 31.

These walls, and more generally the non-return baffle 46, can be vibrated, in order to prevent the components 2, 3 from adhering to said walls.

Preferably, the generator 8 and the electrodes 5, 6, and, if applicable, the electrodes 30, 31, are arranged so that the intensity of the separating electric field, on the inner face of the grating 14 that retains the components, in this case notably in the immediate vicinity of the drop altitude H12 or even at the drop altitude H12, is equal to or greater than 100 kV/m, preferably ranging between 100 kV/m and 600 kV/m, and more preferably ranging between 200 kV/m and 400 kV/m.

Such an intensity advantageously will be high enough to force the charged components 2, 3 to be extracted through the grating 14.

Moreover, selecting a moderate intensity, for example, equal to or less than 400 kV/m, will advantageously allow the separating electric field to be created by means of generators 8 with a maximum voltage of less than 100 kV, and which are therefore relatively inexpensive and easy to implement, notably in view of the safety standards applicable to such generators 8 in terms of isolation distances.

It should be noted that the required intensity notably can be obtained by creating a potential difference of 50 kV, in this case as a direct voltage, for example, between a first and a second electrode 5, 6 that are spaced apart by a centre distance of 80 cm, that each has a 30 cm diameter, and that are associated with a containment drum 15 having, on the grating 14, an internal diameter of 30 cm, the central axis X15 of which is horizontally located in the middle of the centre axis separating the central axis X5 of the first electrode 5 from the central axis X6 of the second electrode, and vertically at an altitude ranging between 0 cm and 40 cm above the altitude common to the two central axes X5, X6 of said first and second electrodes.

At the first constriction 24, at the first altitude H24, the intensity of the separating electric field can range between 100 kV/m and 400 kV/m.

At the second constriction 32, at the second altitude H32, the intensity of the separating electric field can range between 200 kV/m and 600 kV/m.

Figure 3:
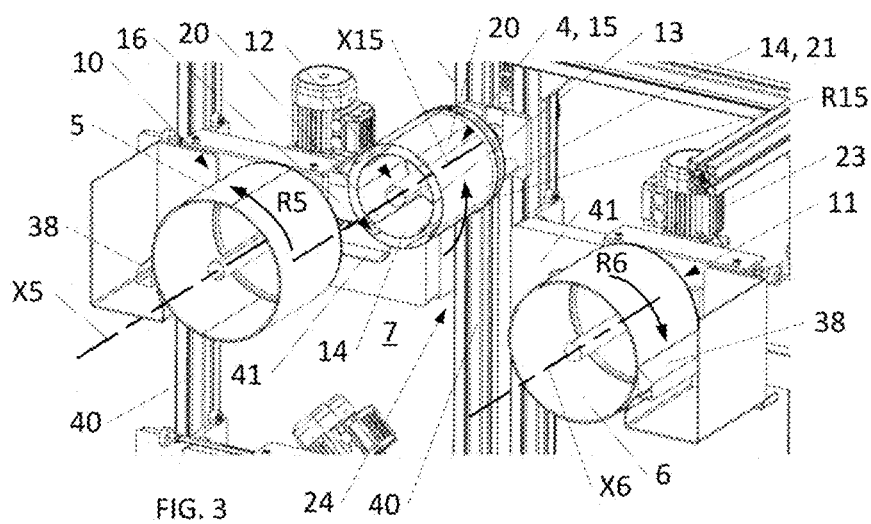
FIG. 3 illustrates, as a partial perspective section view, details of the arrangement of the collectors of the first stage of electrodes of the installation of FIGS. 1 and 2, notably with the scrapers allowing the components captured by the cylindrical electrodes to be detached.

The electric field intensity values provided above for the first altitude H24 and the second altitude H32 can notably correspond to a situation in which, as illustrated in FIGS. 3 and 5, the shortest distance that separates the first electrode 5 from the second electrode 6 is larger than the shortest distance that separates the third electrode 30 from the fourth electrode 31.

With this being the case, the distances separating the electrodes 5, 6, respectively, the electrodes 30, 31, of the same pair clearly could be adjusted, as could the potential difference applied between these electrodes, as a function of the intensity of the desired separating electric field.

Thus, in particular, and as illustrated herein in FIG. 6, the first electrode 5 and the second electrode 6 can be closer to each other than the third and the fourth electrode 30, 31 are between them, i.e., the shortest distance separating the first electrode 5 from the second electrode 6 can be selected so as to be smaller than the shortest distance separating the third electrode 30 from the fourth electrode 31, instead of being selected so as to be greater.

If applicable, the intensity of the separating electric field then can be higher in the first constriction 24 than in the second constriction 32, as illustrated in FIG. 7. For example, the intensity of the separating electric field this time can range between 200 kV/m and 600 kV/m at the first altitude H24 of the upper constriction 24, while it will range between 100 kV/m and 400 kV/m at the second altitude H32 of the lower constriction 32.

Of course, the invention as such relates to a separation method allowing, from a mixture 1 that contains at least one first family of components 2, preferably fibres 2, and one second family of components 3, preferably granules 3, the components 2 belonging to the first family to be separated from the components 3 belonging to the second family.

Such a method preferably can be implemented by means of an installation 100 as described above.

It should be noted that the method according to the invention preferably and advantageously forms a dry separation method, which does not require the use of solvent or treating the components 2, 3 with any liquid solution.

The separation method according to the invention comprises a step (S1) of creating a separating electric field, during which step a potential difference is applied between at least one first electrode 5 and one second electrode 6 together defining a gap 7 so as to generate, in said gap 7, an electric field, called "separating electric field", a step (S2) of electrostatically charging the mixture 1, during which step electrostatic charges are conferred upon the components 2, 3 of the mixture by the triboelectric effect, with said electrostatic charges having opposite polarities depending on whether the components 2, 3 belong to the first family or to the second family, then a sorting step (S3), during which the separating electric field is used to direct the charged components 2 of the first family towards a first collector 10 that captures said components 2 of the first family, and to direct the charged components 3 of the second family towards a second collector 11 that is distinct from the first collector 10 and that captures said components 3 of the second family.

According to the invention, the electrostatic charging step (S2) comprises a selective retention phase (S201), during which the mixture 1 is placed inside an enclosure 12 that is separated from the first and second electrodes 5, 6 and from the first and second collectors 10, 11 by a containment wall 13, and said mixture 1 present in the enclosure is subjected to the triboelectric effect, in the presence of the separating electric field, and, depending on whether or not the level of electrostatic charge reached by some components 2, 3 corresponds to a charge level that is considered to be sufficient, said components 2, 3 are allowed to exit the enclosure 12 so that said components 2, 3 can reach the collectors 10, 11 under the effect of the separating electric field, or, on the contrary, said components 2, 3 are temporarily prevented from exiting the enclosure, by retaining them by means of the containment wall 13, and by continuing the triboelectric effect on said components 2, 3, until said components 2, 3 have acquired an electrostatic charge with a charge level that is considered to be sufficient to be able to be released from the enclosure 12 towards the collectors 10, 11.

Thus, the sorting step (S3) is preceded by a selective retention step (S201) that allows the components 2, 3 that are initially uncharged or hardly charged, to be retained, in this case by means of the grating 14, in the buffer zone formed by the enclosure 12, until said components have acquired a charge that is sufficient to trigger their extraction out of the enclosure 12, through the grating 14, and their release into the gap 7, from which point said charged components 2, 3 then travel to the collectors 10, 11. The grating 14, and more specifically the sizing of the mesh M14 of the screen formed by said grating 14, advantageously automatically ensures that, for each component 2, 3 considered individually, said component is released into the gap 7 only, and as soon as, the conditions, notably the electrostatic charge threshold adapted to the considered component, are combined so that the separating electric field conveys said component up to the collector 10, 11 that corresponds thereto.

Preferably, during the separation method according to the invention, a separating electric field is created that at least partially extends below the enclosure 12, and that has at least two intensity peaks 50, 52 that are vertically stepped and are separated by an intensity trough 51, so as to form a first upper capturing stage 35, with which at least some of the components 2, 3 originating from the enclosure 12 are captured, then so as to form a second lower capturing stage 36 with which at least some of the components 2, 3 originating from the enclosure 12 and not captured by the first upper capturing stage 35 are captured.

Each stage 35, 36 preferably corresponds to a different pair of electrodes 5, 6, respectively, 30, 31.

Advantageously, such a stepped structure considerably limits the components 2, 3 falling to the bottom of the installation, and promotes efficient discharging of each family of components, with a good flow rate, since said discharging is distributed over two stages 35, 36, and thus two capturing stages 35, 36 are assigned to capturing and discharging the same family of components and therefore several collectors that work simultaneously.

Of course, it will be possible, for example, in accordance with the above description concerning the first alternative arrangement of the installation 100, either to cause the at least two intensity peaks 50, 52, and therefore the two capturing stages 35, 36, to both be located under the enclosure 12, i.e., at an altitude lower than the drop altitude H12, or, in accordance with the above description concerning the second alternative, called "staggered" alternative, to cause the first intensity peak 50, and therefore the first capturing stage 35, on the contrary, to be located above the enclosure 12, at the very least above the drop altitude H12 corresponding to the lowest point of the enclosure 12 (and therefore of the grating 14) through which the components 2, 3 of the mixture 1 can escape, while the second intensity peak 52, and therefore the second capturing stage 36, is located below the enclosure 12, at an altitude lower than the drop altitude H12.

Preferably, the separation method applies to a mixture 1 that comprises fibres 2 as a first family of components, which fibres are preferably polyethylene terephthalate-based, and that comprises granules 3 as a second family of components, which granules are preferably rubber-based.

At least some of the fibres 2, preferably most of the fibres 2 (i.e., more than 50% of the number of fibres present), or even all the fibres 2, assume a length that is equal to or greater than a first predetermined reference value L2, while at least some of the granules 3, preferably most of the granules (i.e., more than 50% of the number of granules present), or even all the granules 3, assume an equivalent diameter that is equal to or less than a second predetermined reference value L3, strictly less than the first reference value L2.

Advantageously, it is then possible to use, in order to carry out the selective retention phase (S201), a grating 14 that is integrated in the containment wall 13 and that forms a screen whose mesh M14 ranges between the first reference value L2 and the second reference value L3, i.e.,: L3<M14<L2.

According to a particularly preferred application possibility, the invention relates to a method for recycling a pneumatic tire comprising a grinding step, during which at least one portion of said pneumatic tire is reduced, for example, the tread of said tire, into a mixture containing textile fibres 2 and granules 3 made of a rubber-based material, and then a separation step, during which a separation method according to any one of the features described above is applied to said mixture.

Of course, the invention is by no means limited to the sole embodiments described above, with a person skilled in the art notably being capable of isolating or of freely combining any of the aforementioned features, or of replacing them with equivalents.

What is claimed is:

1. A separation installation intended to receive a mixture containing at least one first family of components and one second family of components, said installation comprising:
   a tribocharger which is arranged to receive the mixture and, through the triboelectric effect, to confer electrostatic charges upon the components of said mixture, which electrostatic charges have opposite polarities depending on whether the components belong to the first family or to the second family,
   said installation further comprising at least one first electrode and one second electrode, which are separated from each other by a gap and are connected to a generator that allows a potential difference to be applied between the first electrode and the second electrode in order to generate a separating electric field in the gap that is intended to direct the charged components, according to their polarity, either towards a first collector intended to collect components of the first family, or, respectively, towards a second collector distinct from the first collector and intended to collect components of the second family,
   wherein said tribocharger receives the mixture inside an enclosure that is delimited by a containment wall that separates said enclosure from the first and second electrodes and first and second collectors,
   said containment wall being arranged such that the mixture that is contained in the enclosure experiences the triboelectric charging effect and is simultaneously exposed to the separating electric field, and
   said containment wall being provided with a grating that is arranged so as to retain components of the mixture inside the enclosure until said components have reached, under the effect of the tribocharger, an electrostatic charge that is sufficient for said components to escape from the enclosure, by crossing the containment wall through the grating, under the effect of the separating electric field, and to thus reach the collector that corresponds to them, as a function of their polarity.

2. The installation according to claim 1, wherein the tribocharger comprises a cylindrical containment drum that is delimited by a tubular side wall that extends along and around a central axis forming an angle of less than 30 degrees with the horizontal, which tubular side wall forms the containment wall and at least one portion of which forms the grating.

3. The installation according to claim 1, wherein the first electrode is formed by a cylindrical electrode rotatably mounted about a first horizontal central axis and a surface of which forms a portion of the first collector while being capable of collecting the components of the first family and of discharging said components out of the gap by rotational movement of said first electrode, and
   the second electrode is formed by a second cylindrical electrode rotatably mounted about a second horizontal central axis, radially offset relative to the first central axis, with a surface of said second cylindrical electrode forming a portion of the second collector while being capable of collecting the components of the second family and of discharging said components out of the gap by rotational movement of said second electrode.

4. A separation installation intended to receive a mixture containing at least one first family of components and one second family of components, said installation comprising:
   a tribocharger which is arranged to receive the mixture and, through the triboelectric effect, to confer electrostatic charges upon the components of said mixture, which electrostatic charges have opposite polarities depending on whether the components belong to the first family or to the second family,
   said installation further comprising at least one first electrode and one second electrode, which are separated from each other by a gap and are connected to a generator that allows a potential difference to be applied between the first electrode and the second electrode in order to generate a separating electric field in the gap that is intended to direct the charged components, according to their polarity, either towards a first collector intended to collect components of the first family, or, respectively, towards a second collector distinct from the first collector and intended to collect components of the second family,
   wherein said tribocharger receives the mixture inside an enclosure that is delimited by a containment wall that separates said enclosure from the first and second electrodes and first and second collectors,
   said containment wall being arranged such that the mixture that is contained in the enclosure experiences the triboelectric charging effect and is simultaneously exposed to the separating electric field, and
   said containment wall being provided with a grating that is arranged so as to retain components of the mixture inside the enclosure until said components have reached, under the effect of the tribocharger, an electrostatic charge that is sufficient for said components to escape from the enclosure, by crossing the containment wall through the grating, under the effect of the separating electric field, and to thus reach the collector that corresponds to them, as a function of their polarity,
   wherein the first electrode and the second electrode together form, at the minimum distance between them, a first constriction of the gap located at a first altitude,
   the installation comprises a third electrode and a fourth electrode, also experiencing a potential difference, and which together form, at the minimum distance between them, a second constriction of the gap that is located at a second altitude lower than the first altitude, such that the separating electric field successively has, along the vertical, a first intensity peak in the first constriction, at the first altitude, then an intensity which, between the first altitude and the second altitude, firstly decreases and then re-increases in order to form an intensity trough and then to reach a second intensity peak in the second constriction, at the second altitude, and
   the enclosure of the tribocharger is located at a drop altitude that is greater than the first altitude of the first constriction.

5. A separation installation intended to receive a mixture containing at least one first family of components and one second family of components, said installation comprising:
   a tribocharger which is arranged to receive the mixture and, through the triboelectric effect, to confer electrostatic charges upon the components of said mixture, which electrostatic charges have opposite polarities depending on whether the components belong to the first family or to the second family,
   said installation further comprising at least one first electrode and one second electrode, which are separated from each other by a gap and are connected to a generator that allows a potential difference to be applied between the first electrode and the second electrode in order to generate a separating electric field in the gap that is intended to direct the charged components, according to their polarity, either towards a first collector intended to collect components of the first family, or, respectively, towards a second collector distinct from the first collector and intended to collect components of the second family, wherein said tribocharger receives the mixture inside an enclosure that is delimited by a containment wall that separates said enclosure from the first and second electrodes and first and second collectors, said containment wall being arranged such that the mixture that is contained in the enclosure experiences the triboelectric charging effect and is simultaneously exposed to the separating electric field, said containment wall being provided with a grating that is arranged so as to retain components of the mixture inside the enclosure until said components have reached, under the effect of the tribocharger, an electrostatic charge that is sufficient for said components to escape from the enclosure, by crossing the containment wall through the grating, under the effect of the separating electric field, and to thus reach the collector that corresponds to them, as a function of their polarity, wherein the first electrode and the second electrode together form, at the minimum distance between them, a first constriction of the gap located at a first altitude, the installation comprises a third electrode and a fourth electrode, also experiencing a potential difference, and which together form, at the minimum distance between them, a second constriction of the gap that is located at a second altitude lower than the first altitude, such that the separating electric field successively has, along the vertical, a first intensity peak in the first constriction, at the first altitude, then an intensity which, between the first altitude and the second altitude, firstly decreases and then re-increases in order to form an intensity trough and then to reach a second intensity peak in the second constriction, at the second altitude, and the enclosure of the tribocharger is located at a drop altitude that is lower than the first altitude of the first constriction and higher than the second altitude of the second constriction.

6. A separation installation intended to receive a mixture containing at least one first family of components and one second family of components, said installation comprising:

a tribocharger which is arranged to receive the mixture and, through the triboelectric effect, to confer electrostatic charges upon the components of said mixture, which electrostatic charges have opposite polarities depending on whether the components belong to the first family or to the second family, said installation further comprising at least one first electrode and one second electrode, which are separated from each other by a gap and are connected to a generator that allows a potential difference to be applied between the first electrode and the second electrode in order to generate a separating electric field in the gap that is intended to direct the charged components, according to their polarity, either towards a first collector intended to collect components of the first family, or, respectively, towards a second collector distinct from the first collector and intended to collect components of the second family, wherein the first electrode is formed by a cylindrical electrode rotatably mounted about a first horizontal central axis and a surface of which forms a portion of the first collector while being capable of collecting the components of the first family and of discharging said components out of the gap by rotational movement of said first electrode, the second electrode is formed by a second cylindrical electrode rotatably mounted about a second horizontal central axis, radially offset relative to the first central axis, with a surface of said second cylindrical electrode forming a portion of the second collector while being capable of collecting the components of the second family and of discharging said components out of the gap by rotational movement of said second electrode, wherein said tribocharger receives the mixture inside an enclosure that is delimited by a containment wall that separates said enclosure from the first and second electrodes and first and second collectors, said containment wall being arranged such that the mixture that is contained in the enclosure experiences the triboelectric charging effect and is simultaneously exposed to the separating electric field, said containment wall being provided with a grating that is arranged so as to retain components of the mixture inside the enclosure until said components have reached, under the effect of the tribocharger, an electrostatic charge that is sufficient for said components to escape from the enclosure, by crossing the containment wall through the grating, under the effect of the separating electric field, and to thus reach the collector that corresponds to them, as a function of their polarity, wherein third and fourth electrodes are each also formed by a cylindrical electrode rotatably mounted about a horizontal central axis, and each of the first, second, third and fourth electrodes belongs to a distinct collector, such that each of said first, second, third and fourth electrodes can discharge the components captured on the electrode out of the gap, independently of the other electrodes.

7. A separation installation intended to receive a mixture containing at least one first family of components and one second family of components, said installation comprising:

a tribocharger which is arranged to receive the mixture and, through the triboelectric effect, to confer electrostatic charges upon the components of said mixture, which electrostatic charges have opposite polarities depending on whether the components belong to the first family or to the second family, said installation further comprising at least one first electrode and one second electrode, which are separated from each other by a gap and are connected to a generator that allows a potential difference to be applied between the first electrode and the second electrode in order to generate a separating electric field in the gap that is intended to direct the charged components, according to their polarity, either towards a first collector intended to collect components of the first family, or, respectively, towards a second collector distinct from the first collector and intended to collect components of the second family, wherein said tribocharger receives the mixture inside an enclosure that is delimited by a containment wall that separates said enclosure from the first and second electrodes and first and second collectors, said containment wall being arranged such that the mixture that is contained in the enclosure experiences the triboelectric charging effect and is simultaneously exposed to the separating electric field, and said containment wall being provided with a grating that is arranged so as to retain components of the mixture inside the enclosure until said components have reached, under the effect of the tribocharger, an electrostatic charge that is sufficient for said components to escape from the enclosure, by crossing the containment wall through the grating, under the effect of the separating electric field, and to thus reach the collector that corresponds to them, as a function of their polarity, wherein the surfaces of the electrodes are each covered with a layer made of an electrically insulating material in order to prevent an exchange of charges from the electrodes with the components that adhere to the electrodes.

8. A separation installation intended to receive a mixture containing at least one first family of components and one second family of components, said installation comprising:
    a tribocharger which is arranged to receive the mixture and, through the triboelectric effect, to confer electrostatic charges upon the components of said mixture, which electrostatic charges have opposite polarities depending on whether the components belong to the first family or to the second family,
    said installation further comprising at least one first electrode and one second electrode, which are separated from each other by a gap and are connected to a generator that allows a potential difference to be applied between the first electrode and the second electrode in order to generate a separating electric field in the gap that is intended to direct the charged components, according to their polarity, either towards a first collector intended to collect components of the first family, or, respectively, towards a second collector distinct from the first collector and intended to collect components of the second family,
    wherein said tribocharger receives the mixture inside an enclosure that is delimited by a containment wall that separates said enclosure from the first and second electrodes and first and second collectors,
    said containment wall being arranged such that the mixture that is contained in the enclosure experiences the triboelectric charging effect and is simultaneously exposed to the separating electric field, and
    said containment wall being provided with a grating that is arranged so as to retain components of the mixture inside the enclosure until said components have reached, under the effect of the tribocharger, an electrostatic charge that is sufficient for said components to escape from the enclosure, by crossing the containment wall through the grating, under the effect of the separating electric field, and to thus reach the collector that corresponds to them, as a function of their polarity,
    wherein the electrodes that define the separating electric field as a whole occupy an altitude range of the gap that extends from the altitude of the lowest point of all of said electrodes to the highest point of all of said electrodes,
    the tribocharger is located in an upper part of the installation, such that at least part of the altitude range of the gap extends below the altitude of the lowest point of the enclosure receiving the mixture,
    the installation comprises, in a lower part, in line with the first tribocharger and at an altitude that is strictly lower than the altitude of said first tribocharger, a fluidized bed that forms a second tribocharger capable of electrically recharging and of resuspending the components of the mixture in the gap, which components would have fallen from the first tribocharger and would have vertically passed through the gap without being captured by the collectors.

9. The installation according to claim 8 further comprising at an intermediate altitude located between a first upper capturing stage, formed by the first electrode and the second electrode, and a lower second capturing stage, formed by a third electrode and a fourth electrode, a non-return baffle that is arranged to allow the components not captured by the first capturing stage to pass towards the second capturing stage, while preventing the components resuspended in the second capturing stage by the fluidized bed from rising beyond said non-return baffle, with said non-return baffle to this end with converging walls that is able to collect the components falling from the first capturing stage and to direct said components, through a lower opening, towards the second capturing stage, then comprising a divergent deflector, which is placed under the hopper in line with the lower opening so as to allow the components originating from the hopper to fall in the second capturing stage, while preventing the components resuspended in the second capturing stage by the fluidized bed from rising through the lower opening towards the first capturing stage.

10. The installation according to claim 1, wherein the generator and the electrodes are arranged such that the intensity of the separating electric field, on the inner face of the grating that retains the components, is equal to or greater than 100 kV/m.

11. The installation according to claim 1, wherein the grating forms a screen, the mesh of which ranges between 1 mm and 10 mm.

12. A separation method allowing, from a mixture that contains at least a first family of components and a second family of components the components belonging to the first family to be separated from the components belonging to the second family, said method comprising:
    creating a separating electric field, during which step a potential difference is applied between at least one first electrode and one second electrode together defining a gap so as to generate a separating electric field in said gap,
    electrostatically charging the mixture, during which step electrostatic charges are conferred upon the components of the mixture by the triboelectric effect, which electrostatic charges have opposite polarities depending on whether the components belong to the first family or the second family,
    a sorting step, during which the separating electric field is used to direct the charged components of the first family towards a first collector that captures said components of the first family, and to direct the charged components of the second family towards a second collector that is distinct from the first collector and that captures said components of the second family,
    wherein the electrostatic charging step comprises a selective retention phase, during which the mixture is placed inside an enclosure that is separated from the first and second electrodes and from the first and second collectors by a containment wall, and
    said mixture present in the enclosure is subjected to the triboelectric effect, in the presence of the separating electric field, and, depending on whether or not the level of electrostatic charge reached by some components corresponds to a charge level that is considered to be sufficient,
    said components are allowed to exit the enclosure so that said components can reach the collectors under the effect of the separating electric field, or, on the contrary, said components are temporarily prevented from exiting the enclosure, by retaining them by means of the containment wall, and by continuing the triboelectric effect on said components, until said components have acquired an electrostatic charge with a charge level that is considered to be sufficient to be able to be released from the enclosure towards the collectors, wherein a separating electric field is created that at least partially extends below the enclosure, and that has at least two intensity peaks vertically stepped and separated by an intensity trough, so as to form a first upper capturing stage, with which at least some of the components originating from the enclosure are captured, then a second lower capturing stage with which at least some of the components originating from the enclosure and not captured by the first upper capturing stage are captured.

13. A separation method allowing, from a mixture that contains at least a first family of components and a second family of components the components belonging to the first family to be separated from the components belonging to the second family, said method comprising:

creating a separating electric field, during which step a potential difference is applied between at least one first electrode and one second electrode together defining a gap so as to generate a separating electric field in said gap, electrostatically charging the mixture, during which step electrostatic charges are conferred upon the components of the mixture by the triboelectric effect, which electrostatic charges have opposite polarities depending on whether the components belong to the first family or the second family, a sorting step, during which the separating electric field is used to direct the charged components of the first family towards a first collector that captures said components of the first family, and to direct the charged components of the second family towards a second collector that is distinct from the first collector and that captures said components of the second family, wherein the electrostatic charging step comprises a selective retention phase, during which the mixture is placed inside an enclosure that is separated from the first and second electrodes and from the first and second collectors by a containment wall, and said mixture present in the enclosure is subjected to the triboelectric effect, in the presence of the separating electric field, and, depending on whether or not the level of electrostatic charge reached by some components corresponds to a charge level that is considered to be sufficient, said components are allowed to exit the enclosure so that said components can reach the collectors under the effect of the separating electric field, or, on the contrary, said components are temporarily prevented from exiting the enclosure, by retaining them by means of the containment wall, and by continuing the triboelectric effect on said components, until said components have acquired an electrostatic charge with a charge level that is considered to be sufficient to be able to be released from the enclosure towards the collectors, wherein a separating electric field is created that at least partially extends below the enclosure, and that has at least two intensity peaks vertically stepped and separated by an intensity trough, so as to form a first upper capturing stage, with which at least some of the components originating from the enclosure are captured, then a second lower capturing stage with which at least some of the components originating from the enclosure and not captured by the first upper capturing stage are captured.

14. A separation method according to claim 12, wherein the method is applied to a mixture comprising fibers as a first family of components, and comprising granules as a second family of components, wherein the length of at least some of the fibers is equal to or greater than a first predetermined reference value, the equivalent diameter of at least some of the granules is equal to or less than a second predetermined reference value, lower than the first reference value, and in order to carry out the selective retention phase, a grating is used that is integrated in the containment wall and that forms a screen, the mesh of which ranges between the first reference value and the second reference value.

15. A method for recycling a pneumatic tire comprising a grinding step, during which at least a portion of said pneumatic tire is reduced into a mixture containing textile fibers and granules made of a rubber-based material and then a separation step, during which a separation method is applied to said mixture, the separation method allowing, from a mixture that contains at least a first family of components and a second family of components the components belonging to the first family to be separated from the components belonging to the second family, the method comprising:

creating a separating electric field, during which step a potential difference is applied between at least one first electrode and one second electrode together defining a gap so as to generate a separating electric field in said gap, electrostatically charging the mixture, during which step electrostatic charges are conferred upon the components of the mixture by the triboelectric effect, which electrostatic charges have opposite polarities depending on whether the components belong to the first family or the second family, a sorting step, during which the separating electric field is used to direct the charged components of the first family towards a first collector that captures said components of the first family, and to direct the charged components of the second family towards a second collector that is distinct from the first collector and that captures said components of the second family, wherein the electrostatic charging step comprises a selective retention phase, during which the mixture is placed inside an enclosure that is separated from the first and second electrodes and from the first and second collectors by a containment wall, and said mixture present in the enclosure is subjected to the triboelectric effect, in the presence of the separating electric field, and, depending on whether or not the level of electrostatic charge reached by some components corresponds to a charge level that is considered to be sufficient, said components are allowed to exit the enclosure so that said components can reach the collectors under the effect of the separating electric field, or, on the contrary, said components are temporarily prevented from exiting the enclosure, by retaining them by means of the containment wall, and by continuing the triboelectric effect on said components, until said components have acquired an electrostatic charge with a charge level that is considered to be sufficient to be able to be released from the enclosure towards the collectors.

16. The installation according to claim 1, wherein the first family of components is fibers and the second family of components is granules.

17. A separation installation intended to receive a mixture containing at least one first family of components and one second family of components, said installation comprising:
- a tribocharger which is arranged to receive the mixture and, through the triboelectric effect, to confer electrostatic charges upon the components of said mixture, which electrostatic charges have opposite polarities depending on whether the components belong to the first family or to the second family,
- said installation further comprising at least one first electrode and one second electrode, which are separated from each other by a gap and are connected to a generator that allows a potential difference to be applied between the first electrode and the second electrode in order to generate a separating electric field in the gap that is intended to direct the charged components, according to their polarity, either towards a first collector intended to collect components of the first family, or, respectively, towards a second collector distinct from the first collector and intended to collect components of the second family,
- wherein said tribocharger receives the mixture inside an enclosure that is delimited by a containment wall that separates said enclosure from the first and second electrodes and first and second collectors,
- said containment wall being arranged such that the mixture that is contained in the enclosure experiences the triboelectric charging effect and is simultaneously exposed to the separating electric field, and
- said containment wall being provided with a grating that is arranged so as to retain components of the mixture inside the enclosure until said components have reached, under the effect of the tribocharger, an electrostatic charge that is sufficient for said components to escape from the enclosure, by crossing the containment wall through the grating, under the effect of the separating electric field, and to thus reach the collector that corresponds to them, as a function of their polarity,
- wherein the tribocharger comprises a cylindrical containment drum that is delimited by a tubular side wall that extends along and around a central axis forming an angle of less than 30 degrees with the horizontal, which tubular side wall forms the containment wall and at least one portion of which forms the grating, and
- wherein the tubular side forms a non-zero angle with the horizontal.

18. The installation according to claim 3, wherein the second horizontal central axis is radially offset relative to the first central axis and located at the same altitude as that of the first central axis.

19. The installation according to claim 7, wherein the surface of the electrodes is cylindrical.

20. The installation according to claim 8, wherein at least half of the altitude range of the gap extends below the altitude of the lowest point of the enclosure receiving the mixture.

* * * * *